United States Patent [19]

Sollinger et al.

[11] Patent Number: 4,985,972
[45] Date of Patent: Jan. 22, 1991

[54] ROLL WITH DEFLECTION COMPENSATION

[75] Inventors: Hans-Peter Sollinger; Zygmunt Madrzak, both of Heidenheim, Fed. Rep. of Germany

[73] Assignee: J. M. Voith GmbH, Heidenheim, Fed. Rep. of Germany

[21] Appl. No.: 529,882

[22] Filed: May 29, 1990

[30] Foreign Application Priority Data

Jun. 6, 1989 [DE] Fed. Rep. of Germany ....... 3918413

[51] Int. Cl.$^5$ ............................................. B21B 13/14
[52] U.S. Cl. .................................................. 29/116.2
[58] Field of Search ...................... 29/113.2, 116.2, 132

[56] References Cited

U.S. PATENT DOCUMENTS 4,062,097 12/1977 Riihinen ............................ 29/116.2

FOREIGN PATENT DOCUMENTS 1761641 6/1971 Fed. Rep. of Germany .

Primary Examiner—Timothy V. Eley
Assistant Examiner—C. Richard Martin
Attorney, Agent, or Firm—Jeffers, Hoffman & Niewyk

[57] ABSTRACT

A hollow roll featuring a layer of permanent magnets along axial sections of the roll is provided. Pole carriers having permanent magnets are arranged opposite the layer of permanent magnets on the roll. The pole carriers are supported on a core carrier, preferably by means of hydraulic or pneumatic thrust elements, or servomotors. The polarity is arranged such that like poles of the magnets oppose one another. The pole carriers are arranged in an axial row, and are movable in guideways while supported by servoelements. The servoelements are preferably activated hydraulically or pneumatically.

22 Claims, 1 Drawing Sheet

ROLL WITH DEFLECTION COMPENSATION

BACKGROUND OF THE INVENTION

The invention concerns a roll with deflection compensation. The roll consists of an outer roll shell and an inner core carrier extending axially along the roll shell. The roll shell features an inner continuous layer, at least in the peripheral direction, which is radially magnetized in that only poles of one kind are provided on the inside surface of the magnetic layer of permanent magnets. The core carrier features opposite magnets positioned in the core carrier such that like poles of these magnets oppose like poles of the magnets on the inner continuous layer.

Such a roll is known from the German patent disclosure 17 61 641. On this roll, viewed in axial direction, permanent magnets are sectionally contained both on the inside circumference of a roll shell and the outside circumference of a core carrier. The magnets are evenly distributed across the circumference, with opposite poles opposing each other on the upper half of the circumference and like poles opposing each other on the lower half. A control of the fields acting on one another occurs through an axial shift of the pole carriers on the core carrier. This design serves to represent a press roll for use either in paper dewatering devices or in so-called calenders.

The problem underlying the invention is to achieve in very long rolls, which essentially are not subjected to heavy loads on their ends, a simple installability of the roll combined with a simple design but maximum efficacy.

SUMMARY OF THE INVENTION

In a roll of the initially named type, this problem is solved by providing a roll with deflection compensation comprising an outer roll shell and an inner core carrier positioned generally within the outer roll shell. The roll shell has an inner layer that is continuous at least in the peripheral direction and consists generally of permanent magnets. The roll shell has an inside surface provided with only like poles of said magnets whereby the layer is radially magnetized. The inner core carrier extends axially along the roll shell and has a plurality of pole carriers mounted therein. The pole carriers have magnets mounted thereon and positioned within the inner core carrier so that like poles of the core carrier magnets and the roll shell magnets oppose one another. The core carrier magnets are positioned in an area of the major load plane on a portion of the circumference of the core carrier. The core carrier magnets are mounted so as to be movable at least predominantly parallel to the direction of the major load plane and are supported by servoelements which act on the pole carriers.

BRIEF DESCRIPTION OF THE DRAWINGS

The above mentioned and other features and objects of this invention, and the manner of attaining them, will become more apparent and the invention will be better understood by reference to the following description of embodiments of the invention taken in conjunction with the accompanying drawings, wherein.

Corresponding reference carriers indicate corresponding parts in each view. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
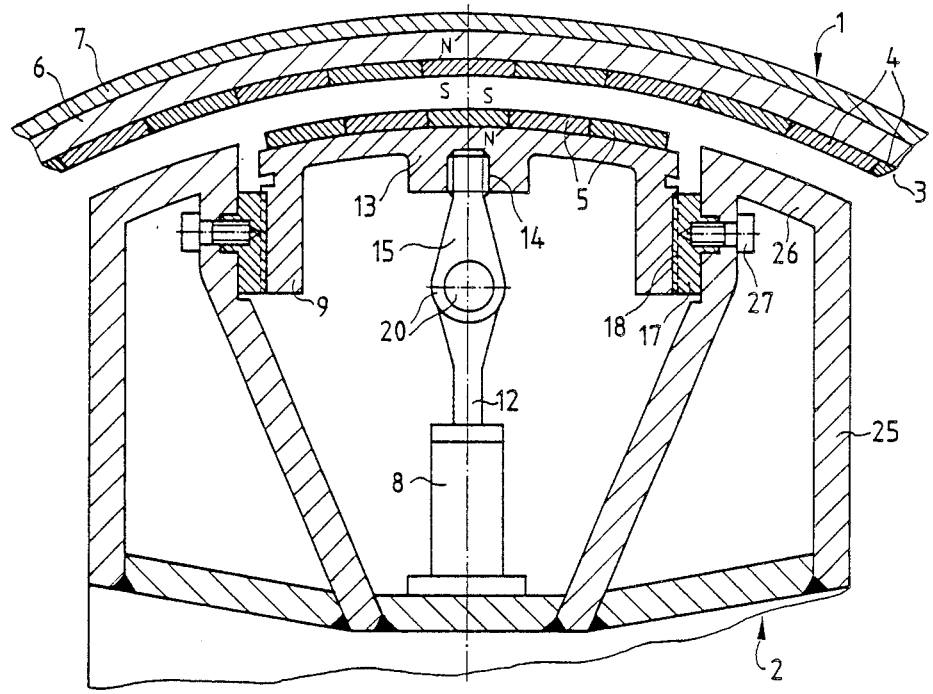
FIG. 1 is a cross-sectional view of a roll, including the core carrier and roll shell.

The roll shell 1 has a three-layer structure comprising a supporting hollow cylinder 6 made of steel. The outside of the roll shell features a coating 7 of rubber, and the inside of the shell, at the points of the pole carriers 9 with opposite magnets 5 mounted on the core carrier 2, features a magnetic layer 3. This layer 3 consists preferably of individual magnet platelets 4, with one pole always directed radially inward and the other pole radially outward, resulting in a radial magnetization of the magnetic layer 3, signified in FIG. 1 by poles N,S. The magnets 5 of the pole carrier 9 are magnet platelets of the same type, arranged in such a way that opposite poles of pole carrier 9 and roll shell 1 oppose each other. The pole carrier 9 features a projection 13 with a threaded bore 14, by means of which a thrust component 15 is connected with the pole carrier 9. The thrust component 15 is connected by way of a joint 20, with the piston rod 12 of a hydraulic or pneumatic servomotor 8. The pole carrier 9 is mounted in the core carrier 2, by means of a slider block 17 which is connected with the core carrier through screws 27, so as to be movable essentially radially through a slideway 18.

The core carrier 2 illustrated here is relatively small, for drawing reasons, but the walls 25 and 26 could be fashioned so as to align with each other in the form of a hollow cylinder, in order to achieve a high strength of the core carrier. This hollow cylinder would then have recesses practically only at the locations of the pole carriers, for accommodating them. The major load plane P is shown in FIG. 1, normal to the view shown in the drawing. With respect to FIG. 2, the major load plane is the plane of the drawing (sheet) of FIG. 2.

The magnets which are used enable extremely high field strengths, with the energy density from $B \times H$ amounting to maximally 300 kJ/m3. The temperature resistance ranges up to about 120° C. through 150° C.

Figure 2:
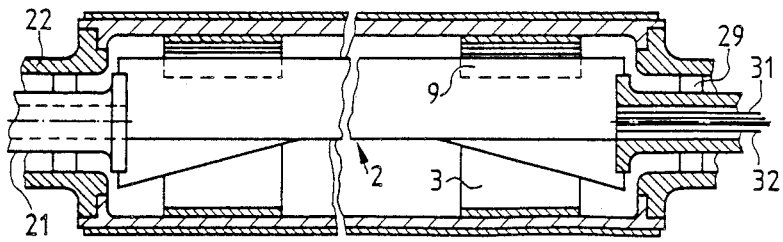
FIG. 2 is an axial sectional view of the roll.

The pole carriers 9 are arranged approximately laterally reversed along the axis of the hollow roll 1, as can be seen from FIG. 2. Since the opposite magnets 5 are arranged on only one side of the core carrier, the very long rolls permit an easy installation, all the more so as the pole carriers 9 may be radially retracted inwardly with regard to the roll shell 1 for installation. Operationally, an air gap of about maximally 2 mm is adjusted relative to the magnet layer 3 of the hollow roll 1.

The hydraulic or pneumatic stressing of the pole carriers 9 by means of the servomotors 8 enables an exact force adjustability as regards the deflection compensation of the hollow roll 1. To that end, all of the servomotors 8 can normally be subjected to the same pressure. In this regard an even sectional load may be obtained that corresponds to the deflection of the backing roll that interacts with the hollow roll 1. The deflection of the backing roll occurs in this application solely on account of gravity.

The application is intended primarily for applicator rolls in coaters, with the hollow roll 1 dipping into a sump of coating substances. It has been recognized that the buoyancy of the hollow roll 1 varies noticeably with different coating substances, so that a crowning of interacting rolls (hollow roll 1=applicator roll and backing roll) is not sufficient to produce a uniform gap between these rolls at all operating conditions. Joining in operationally, in addition, is the hydrodynamic pressure of the coating substance which acts upon the rolls in the gap between the two rolls. These pressures are readily controllable with the fields of the permanent magnets. The various pole carriers 9 may also be forced down at different hydraulic or pneumatic pressures, in keeping with a disuniform deflection line of the backing roll.

It is recommended to make the core carrier 2 from nonmagnetic material, for instance austenitic steel, at least in the area of the core carrier that is near the roll shell, where the magnetic forces can be effective. In its part supporting the permanent magnets 5, the pole carrier 9 should consist of a soft magnetic material, for instance soft magnetic steel. Instead of the joint 20, an axially continuous pressure hose could also be provided where the part 8 could then be a support of approximately the same cross section while part 12 could be a continuous support bar having the same cross section as illustrated.

It is possible to utilize only three pole carriers 9, naturally of appropriate width, and generate an overall magnetic force of 45 kN, for instance when the length of the roll shell is 19 m.

The roll shell is mounted through the intermediary of bearings 29, on journals 21 of the core carrier 2. Shown in FIG. 2, additionally, are lines 31 and 32 which carry hydraulic fluid or compressed air to the servomotors and back.

The core carrier 2 features on its ends journals 21 by means of which it supports by way of bearings corresponding journals 22 of the roll shell 1. The hydraulic fluid lines running to the servoelements 8 are marked 32 in FIG. 2.

While this invention has been described as having a preferred design, the invention can be further modified within the spirit and scope of this disclosure. This application is therefore intended to cover any variations, uses or adaptations of the invention using its general principles. Further, this application is intended to cover such departures from the present disclosure as come within known or customary practice in the art to which this invention pertains and which fall within the limits of the appended claims.

What is claimed is:

1. A roll with deflection compensation comprising:
an outer roll shell and an inner core carrier positioned generally within said outer roll shell, said roll shell having an inner layer, said inner layer being continuous at least in the peripheral direction, said inner layer consisting generally of permanent magnets and having an inside surface provided with only like poles of said magnets whereby said layer is radially magnetized, said inner core carrier extending axially along the roll shell and having a plurality of pole carriers mounted therein, said pole carriers having magnets mounted thereon, said magnets being positioned so that like poles of the core carrier magnets and the roll shell magnets oppose one another, said core carrier magnets being positioned on a portion of the circumference of said core carrier in the area of an axially-extending major load plane, said core carrier magnets being mounted so as to be movable at least predominantly parallel to the direction of said major load plane and being supported by servoelements which act on said pole carriers.

2. The roll as described in claim 1, wherein said roll shell has an inside diameter having a radial contour and said core carrier magnets are permanent magnets arranged on at least one pole carrier as a layer, and wherein said layer has a radial outside contour which corresponds generally with the radial contour of the inside diameter of the roll shell.

3. The roll as described in claim 2, wherein said core carrier magnets are axially arranged in sections.

4. The roll as described in claim 2, wherein said servoelements are stressed by hydraulic or pneumatic force with an exact equalization of force.

5. The roll as described in claim 2, wherein said servoelements may be hydraulically or pneumatically activated unevenly, whereby a deflection line of the roll shell may be generated.

6. The roll as described in claim 2, wherein said core carrier consists generally of a nonmagnetic material.

7. The roll as described in claim 2, wherein a gap exists between the inner magnetic layer of said outer roll shell and the core carrier magnets, said gap amounting to maximally 2 mm.

8. The roll as described in claim 1, wherein said pole carriers are supported by hydraulic or pneumatic servoelements.

9. The roll as described in claim 1, wherein said pole carriers are supported by a pressure hose.

10. The roll as described in claim 1, wherein said core carrier magnets are axially arranged on said pole carriers in sections.

11. The roll as described in claim 10, wherein a gap exists between the inner magnetic layer of said outer roll shell and the core carrier magnets, said gap amounting to maximally 2 mm.

12. The roll as described in claim 1, wherein said servoelements are stressed by hydraulic or pneumatic pressure with an exact equalization of force.

13. The roll as described in claim 12, wherein said core carrier consists generally of a nonmagnetic material.

14. The roll as described in claim 13, wherein a portion of the core carrier is in closely-spaced relationship with said roll shell, and at least said closely-spaced portion of aid core carrier consists of said nonmagnetic material, so that the magnetic forces exerted by said magnets may be effective.

15. The roll as described in claim 1, wherein said servoelements may be hydraulically or pneumatically activated unevenly, whereby a deflection line of the roll shell may be generated.

16. The roll as described in claim 15, wherein said core carrier consists generally of a nonmagnetic material.

17. The roll as described in claim 1, wherein said core carrier consists generally of a nonmagnetic material.

18. The roll as described in claim 17, wherein said nonmagnetic material is austenitic steel.

19. The roll as described in claim 17, wherein said nonmagnetic material is a synthetic material.

20. The roll as described in claim 17, wherein a gap exists between the inner magnetic layer of said outer roll shell and the core carrier magnets, said gap amounting to maximally 2 mm.

21. The roll as described in claim 17, wherein a portion of the core carrier is in closely-spaced relationship with said roll shell, and at least said closely-spaced portion of said core carrier consists of said nonmagnetic material, so that the magnetic forces exerted by said magnets may be effective.

22. The roll as described in claim 1, wherein a gap exists between the inner magnetic layer of said outer roll shell and the core carrier magnets, said gap amounting to maximally 2 mm.

* * * * *